United States Patent [19]
Cowap

[11] Patent Number: 6,133,177
[45] Date of Patent: *Oct. 17, 2000

[54] PROCESS FOR REMOVING ORGANIC IMPURITIES WHILE MELTING MINERAL COMPOSITIONS

[75] Inventor: Stephen F. Cowap, Newark, Ohio

[73] Assignee: Owens Corning Fiberglas Technology, Inc., Summit, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/938,720

[22] Filed: Sep. 26, 1997

[51] Int. Cl.⁷ .............................. C03C 13/00; C03C 3/087
[52] U.S. Cl. ................................ 501/36; 501/17; 501/32; 501/35; 65/376; 65/474; 65/482; 264/66
[58] Field of Search .................................... 501/17, 32, 35, 501/36, 72, 27; 65/376, 474, 482; 264/66

[56] References Cited

U.S. PATENT DOCUMENTS

| | | | |
|---|---|---|---|
| 4,649,125 | 3/1987 | Takeuchi et al. | 501/15 |
| 4,814,304 | 3/1989 | Takeuchi et al. | 501/17 |
| 5,346,864 | 9/1994 | Maugendre et al. . | |
| 5,420,082 | 5/1995 | Maugendre et al. . | |

FOREIGN PATENT DOCUMENTS

| | | |
|---|---|---|
| 419322 A1 | 3/1991 | European Pat. Off. . |
| 419322 B1 | 7/1993 | European Pat. Off. . |

*Primary Examiner*—Michael Marchesohi
*Attorney, Agent, or Firm*—Inger H. Eckert; Stephen W. Barns

[57] ABSTRACT

A process for the preparation of molten mineral compositions wherein organic impurities are removed by reaction with oxygen introduced via the decomposition of calcium peroxide.

7 Claims, No Drawings

PROCESS FOR REMOVING ORGANIC IMPURITIES WHILE MELTING MINERAL COMPOSITIONS

TECHNICAL FIELD AND INDUSTRIAL APPLICABILITY OF THE INVENTION

The present invention relates to the process of melting vitrifiable mineral compositions, such as glass, in connection with the formation of fibers. More specifically, the invention relates to the incorporation of calcium peroxide into the batch to release oxygen for the combustion of organic impurities present in the batch during the melting process.

BACKGROUND OF THE INVENTION

Processes for the manufacture of fibers from molten mineral compositions, such as glass fibers, are well known and widely used. In these processes, mixtures of vitrifiable mineral compositions are typically heated in a furnace to a temperature sufficient to melt the mixture and lower the viscosity of the molten composition to a level suitable for fiber formation. Not unexpectedly, heating such compositions to such levels is an energy intensive operation that significantly effects the economics of the manufacturing process. Accordingly, anything that negatively impacts on the efficiency of the furnace in melting the mineral compositions is advantageously avoided.

The presence of impurities in the batches of vitrifiable materials fed to the furnace are known to negatively impact the melting efficiency of the furnace. In this regard, the sources of such impurities can take many forms, as can the mechanism by which they impact the furnace's melting efficiency. For example, the mineral compositions as received from the supplier themselves contain various impurities, in particular, sulfates, sulfides and organic contaminants. When conditions in the furnace are not suitably maintained, the dissolved sulfur species can evolve from the melt in a gaseous form causing a foam layer to form on the surface of the molten glass bath. This phenomenon causes the temperatures within the glass bath to increase due to the insulating character of the foam, and causes a reduction in the heat transfer rate from the molten glass bath to the unmelted batch which floats atop the foam layer. The results is a reduction in the melting rate of batch and an increase in the wear rate of refractories. The presence of organic impurities, such as wood, coal, oil residues and plastics further aggravates the deleterious effects of sulfurous impurities by reducing the activity of oxygen in the molten glass. The lower activity of oxygen causes dissolved sulfates to become less soluble, further increasing the formation rate of foam. For this reason, it is desirable to maintain a high oxygen activity in the melting system to maintain a high sulfate solubility in the glass and rid the batch of organic impurities through oxidation.

To create an oxidizing environment in the furnace, U.S. Pat. No. 5,346,864 suggests that a specific mixture of oxidizing agents be added to the mineral composition. In particular, it is suggested that both an inorganic nitrate, such as sodium nitrate, calcium nitrate or ammonium nitrate, and a second oxidizing agent selected from an oxide of manganese, potassium dichromate and/or ceric oxide be added to the mineral composition. However, while such nitrates generally dissociate at temperatures far below the melting point of the mineral components and therefore generate an oxidizing environment capable of removing many organic impurities present in the glass batch before reaching the molten glass bath and thereby helps to avoid the formation of a vaporous insulating layer between the molten and unmelted mineral batch, the potential for environmentally unfriendly $No_x$ emissions can severely limit the use of such nitrates.

Accordingly, a need exists for an oxidizing agent that decomposes at a temperature sufficiently below the melting point of the mineral materials to facilitate the oxidation of organic impurities before the glass melts and prevents the liberated oxygen from reaching the organic impurities, and to allow the gaseous oxidation products generated thereby to escape through the unmelted batch and avoid the creation of an insulating foam layer between the molten glass and unmelted batch. Further, a need exists for an oxidizing agent that does not cause the generation of environmentally unfriendly $No_x$ emissions and which does not introduce any residues that negatively impact the properties of the resulting glass. Such needs are met by the invention described herein.

SUMMARY OF THE INVENTION

The present invention provides a process for the melting of mineral compositions in preparation for their transformation into fibers, in which an ozidizing environment is created at temperatures sufficiently below the melting point of the mineral components such that oxidation of organic impurities occurs without the gaseous byproducts therefrom becoming entrained in the molten glass and forming an insulating foam between the molten glass and unmelted mineral granules. According to this process, calcium peroxide is added to the mixture of vitrifiable mineral components fed to the melting furnace to create such oxidizing environment upon its thermal decomposition.

As a result, it is possible to use vitrifiable mineral components of lesser purity, and/or include reclyclable glass-based waste product while maintaining the production capacity of the furnace and the quality of the glass produced without appreciably increasing manufacturing costs or introducing potentially environmentally unfriendly emissions into the atmosphere.

DETAILED DESCRIPTION AND PREFERRED EMBODIMENTS OF THE INVENTION

In the process of the present invention, calcium peroxide is added to the batch of vitrifiable mineral components in the melting furnace to provide a low temperature oxidizing environment. The calcium peroxide may be added to the batch materials prior to their introduction into the furnace, or may be added directly to the furnace along with the mineral components. However, it is generally preferred that the calcium peroxide be premixed with the mineral components prior to their introduction into the furnace to ensure that the calcium peroxide is substantially homogeneously distributed throughout the composition. The calcium peroxide is preferably added to the composition in an amount up to about 5 percent by weight of the total composition.

As the temperature of the batch reaches about 575–600° F. (301.7–315.6° C.), the calcium peroxide begins to decompose into oxygen and calcium oxide. Decomposition of the calcium peroxide generally peaks at about 700° F. (371.1° C.). Accordingly, when the glass batch reaches such temperatures, oxygen is released from the calcium peroxide and creates an environment favorable for the oxidation of any organic impurities contained in the glass batch. Importantly, since the glass batch is still well below its melting point, the gaseous by-products of such oxidation, as well as any excess oxygen released from the calcium peroxide decomposition, are able to pass through the granular batch material and escape without forming an insulating layer that impedes melting of the batch. Further, by removing the organic impurities prior to melting of the mineral composition, the presence of carbon in the molten composition is reduced, which tends to reduce $SO_2$ off gassing and to decrease the propensity for foam formation in the molten mineral composition.

As the temperature of the glass batch increases further within the furnace, the remaining calcium oxide dissolves into the molten glass. As a result, no residues are generated which undesirably affect the quality of the glass, nor are potentially environmentally unfriendly by-products generated by the decomposition of the calcium peroxide oxidizing agent.

What is claimed:

1. A process for the production of molten mineral compositions comprising:
   (a) forming a mixture of calcium peroxide with said mineral composition;
   (b) heating said mixture to a temperature sufficient to decompose said calcium peroxide and release oxygen; and
   (c) heating said remaining mixture to a temperature sufficient to melt said mineral composition.

2. The process of claim 1, wherein said mineral composition comprises glass.

3. The process of claim 2, wherein said calcium peroxide is added in an amount up to about 5 weight percent of said mixture.

4. A mixture for producing molten mineral compositions having decreased organic impurities for the production of fibers, comprising a decomposable calcium peroxide and vitrifiable minerals containing organic impurities.

5. The mixture of claim 4, wherein said vitrifiable mineral composition is recyclable glass-based waste product.

6. The mixture of claim 5, wherein said calcium peroxide is present in an amount up to about 5% by weight of said mixture.

7. The mixture of claim 4, wherein the vitrifiable mineral composition is formed of low purity mineral components.

* * * * *